3,197,375
NUCLEAR POWER REACTOR

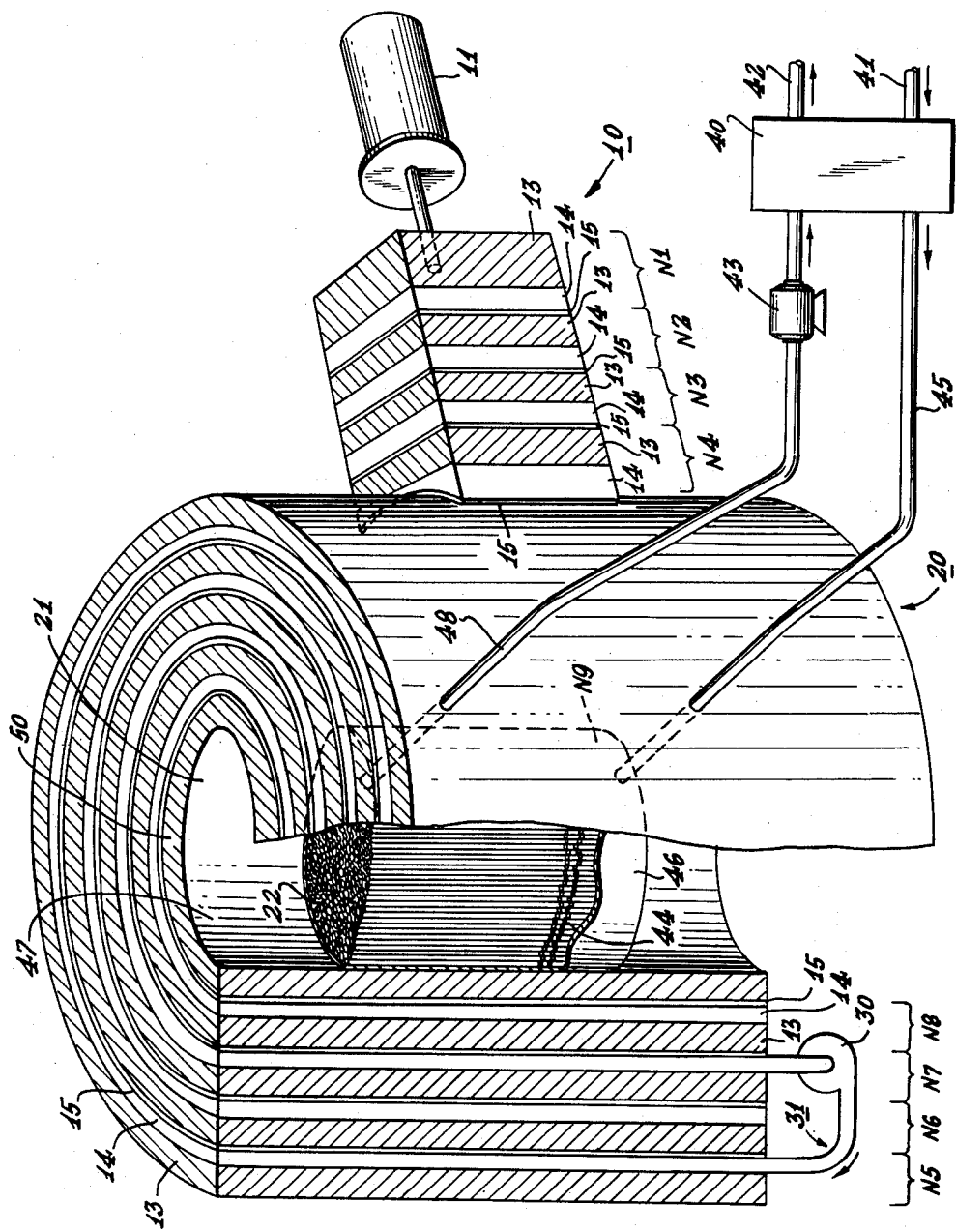

Lyle B. Borst, Ossining, N.Y., assignor to The Dow Chemical Company, Midland, Mich., a corporation of Delaware
Filed Oct. 28, 1958, Ser. No. 770,144
13 Claims. (Cl. 176—11)

My invention, hereinafter described in detail, relates to a nuclear power reactor of fissile fuel operating below criticality. It depends in principle upon supplying to a subcritical reactor a neutron flow sufficient to replace neutrons lost from the reactor by leakage, thereby simulating a self-sustaining supercritical reactor, but with the advantage that the subcritical reactor may be operated without the precautions required for supercritical reactors.

The best mode now contemplated for carrying out the invention is set forth in the following specification and attached schematic drawing.

The reactor has a core 22 surrounded by a dynamic blanket 20. The source of exciting neutrons for the system is a neutron multiplier, now called a Convergatron, of the type described in my application Serial No. 654,837 filed April 24, 1957 and in the applicaton filed by me and Paul Michael on January 28, 1958, Serial No. 711,699, now U.S. Letters Patent 3,056,737, issued October 2, 1962. It is enough for the present disclosure to note that the Convergatron 10 has a controllable source 11 of neutrons in the first of a series of Convergatron stages. Each stage includes three regions: (1) the input or moderator region 13; (2) the intermediate or fuel region 14; and (3) the output or thermal neutron barrier region 15. The input region 13 consists of known moderator materials such as graphite, water or beryllium and functions to slow down fast (epithermal) neutrons to slow (thermal) neutron energy levels. The intermediate region 14 consists of fissile material responsive to thermal energy level neutrons of a concentration and geometric arrangement to evolve neutrons by fission at a rate below criticality. The output region 15 consists of material which is substantially opaque to thermal neutrons and substantially transparent to epithermal neutrons. This region functions to decouple each stage from the succeeding stage for thermal neutron flow and to encourage a polarized flow of epithermal neutrons from the output of each stage to the input of the next stage. The regions are arranged in series. Suitable structure, such as stainless steel or aluminum sheets, is included to prevent contamination of the materials in each region by materials from an adjacent region. Four stages of the Convergatron, designed N1, N2, N3 and N4, are shown in the schematic drawing.

The output of the neutron multiplier or Convergatron 10 is fed to the cylinder 20, which I shall term a dynamic blanket, consisting of a plurality of concentric cylindrical layers constituting additional Convergatron stages. Each stage includes an outer moderator or input region 13, an intermediate or fuel region 14 and an inner thermal barrier region 15. The stages of the dynamic blanket are designated in the drawing N5, N6, N7 and N8 and are arranged so that the output flux of stage N5 is coupled to the input region 13 of stage N6, etc. The dimensions, materials and concentration thereof in each of these stages are selected, as explained in the above mentioned applications, to provide a neutron flux which is polarized to flow inwardly to region 21 of the cylinder 20. Within region 21 is a core 22 of fissile material which functions as the final stage N9. The fissile material in core 22 is made subcritical, that is, with a concentration not capable of a self-sustained chain reaction however large the core. Fission within core 22 is sustained according to the invention by the continuous excitation of the fuel within stage N9 by neutrons from the dynamic blanket and also by reflection of neutrons from a reflector 50 between stage N8 and core 22.

Reflector 50 is a cylindrical layer within barrier layer 15 of stage N8 and surrounding core 22. Layer 50 performs the function of reflecting neutrons escaping from core 22 back into the core. The thickness of the reflector 50 is chosen according to the fraction of neutrons considered necessary to be reflected. In effect, the reflected neutron flux is a supplement to the neutron flux of the dynamic blanket and the desired reflection is therefore determined by the total neutron flux needed to excite and maintain the reactivity of the core at a value such that the theoretical multiplication factor is equal to unity, i.e., the reflected flux plus the blanket flux is equal to the leakage flux. Theoretically, any of the moderator materials such as heavy water, light water, beryllium or carbon (graphite) may be used for the reflector 50. Graphite is preferred because of its high temperature stability.

Suitable heat exchange tubes are placed within the core 22 to extract therefrom energy in the form of heat. Using as an example but one form, the circulating system is provided with a heat exchanger 40 through which a liquid coolant such as sodium (or water) may be made to flow as shown by an inlet 41 and an outlet 42. Liquid sodium is circulated through conduits 44 within the core 22 by a pump 43 through inlet line 45 into chamber 46 in the lower portion of core 22. Chamber 46 is in communication with the lower open ends of conduits 44. Sodium therein is forced upward into upper chamber 47 above the upper open ends of the conduits 44 and pumped through outlet line 48 into exchanger 40. Above and below core 22 the chambers 46 and 47 which contain sodium coolant serve as reflectors. The core 22 is completely enclosed by these reflectors plus the cylindrical reflector 50. The entire reactor is shielded to prevent the escape of radiation by walls made of concrete such as described in my U.S. Letters Patent 2,726,339.

In the following discussion of the mode of operation of a reactor conforming to my invention I shall use the designation $K_{inf}$ for the multiplication factor of the materials, equivalent to assuming a system with no neutron leakage or a system of infinite dimensions, and the designation $K_{eff}$ for the effective multiplication factor of the system of the size described, as is common in the art. $K_{eff}$ is $K_{inf}$ corrected for leakage.

In order to simulate a self-sustaining supercritical reactor and at the same time to obtain the advantage that the reactor will operate subcritically without the need of the precautions required for supercritical reactors, neutrons are supplied to the system, in accordance with my invention, in sufficient amount to replace neutrons lost by leakage.

Accordingly, the core 22 of the reactor is so designed and its constituents are so chosen that $K_{inf}$ is 1. Its dimensions are so chosen that $K_{eff}$ is 0.95. A core meeting these requirements may be designed by modifying known critical reactors. Generally, the modification consists in reducing the proportion of fissile material so that the system becomes subcritical and supplying neutrons to the core from an external source to maintain fission in the core. It is known that power generated in a core of given proportions is proportional to the physical size of the core and the leakage of neutrons is inversely proportional to the area of the surface of the core. The power and leakage may be estimated by known design data and accurately determined by experiment.

My invention may be adapted to any known reactor. Reactors may be classified into two general types: fast neutron reactors and moderated reactors. I shall now describe two examples of cores for my invention, the design data for which are determined by modifying the design of known critical reactors of each type.

A design for lattice arrangement for a fast breeder reactor is published in the Geneva Papers, vol. 5, page 354, Table IV, column PBR. This design was prepared by the Power Reactor Development Co., commonly known as PRDC, for a reactor proposed for construction near Detroit, Michigan. The fuel for this reactor consists of 10% (atomic weight) of fissile plutonium ($Pu^{239}$) and 90% of non-fissile unranium ($U^{238}$). This lattice is of critical mass and produces a self-sustained chain reaction in which $Kinf$ is 1.3 and $Keff$ is 1.0. This PRDC design may be modified, for the purpose of my invention, to reduce the proportion of fissle plutonium so that fissile plutonium ($Pu^{239}$) is 6% and non-fissile uranium ($U^{238}$) is 94%, giving $Kinf = 1.0$ and $Keff$ less than unity.

Assuming that the power desired is 1,000 megawatts, the core 22 in cylindrical form, is calculated by known design formulae to have a radius of one meter and a height of two meters. The mass of sodium coolant required is one-half of that required for the PRDC design quoted.

The following table summarizes the volumetric proportion of the various materials required for core 22:

| Material: | Volumetric proportion |
|---|---|
| $Pu^{239}$ | 0.026 |
| $U^{238}$ | 0.427 |
| Fe, Cr, Ni, etc. (Mechanical Structure) | 0.187 |
| Na (coolant) | 0.360 |
| Total | 1.000 |

The useful power desired determines the required volume of core 22, which in turn, with the use of the above table, allows for a calculation of the actual mass of each of the materials.

The neutron flux from the external source (dynamic blanket 20) required to maintain operation of the subcritical core of this design for the assumed power of 1,000 megawatts is determined as follows. From published data it is known that $3 \times 10^{19}$ fissions per second generate 1,000 megawatts of useful heat. Assuming 2.5 placed. To meet this requirement, 5% of $7.5 \times 10^{19}$ neutrons per second. Based on a calculated estimated, 5% of these neutrons will escape from the core. To maintain this power level in the core these neutrons must be replaced. To meet this requirement 5% of $7.5 \times 10^{19}$ neutrons per second, or $3.7 \times 10^{18}$ neutrons per second is supplied to the core 22 by the dynamic blanket 20.

According to my invention, any accidental loss of the sodium coolant would not cause the fuel material within the core to become critical. The reason of this is that the sodium used for coolant through conduits 44 has a small cross-section for fast neutron capture and $Kinf$ will not be significantly changed.

A serious problem in the reactor art is the effect of fuel meltdown. According to my invention, even if the fuel were to melt into the most concentrated form, namely, a sphere, and thereby have the optimum geometry for criticality, $Keff$ would not be expected to exceed 0.98. Even if the temperature remained at a high value, plutonium, being more volatile than uranium, would distill out of the mass, thereby further reducing the value of $Keff$. The system would be so designed that the plutonium could not accumulate in a supercritical configuration.

The reactor of my invention has a margin of safety between the operating condition of $Keff = 0.95$ and 1.0035, the prompt critical limit for plutonium. This safety margin of .0535 is 15 times greater than the range of the usual critical reactor operating with a $Keff = 1.00$. Because of this relatively large margin of safety, a fast breeder reactor of my invention, may be operated for economically advantageous periods of time before the additional plutonium ($Pu^{239}$) produced by breeding from uranium ($U^{238}$) causes $Keff$ to approach a value of 1.0 or the prompt critical limit of 1.0035. Moreover, the design of the core may provide for values of $Kinf$ between 0.99 and 1.01 without appreciable changes in stability.

The internal breeding ratio of uranium ($U^{238}$) to plutonium ($Pu^{239}$) of 1.6 is expected. Leakage neutrons which may be absorbed in the neutron barrier 15 of stage N8 will effect an increase of 0.1 in the breeding ratio making it 1.7. Thorium rather than cadmium is preferred for barrier 15 of stage N8 since, being a fertile material, it may be used to absorb neutrons escaping from the core.

The second form of my invention is a water-moderated natural uranium reactor. Early studies of natural uranium in ordinary (light) water showed that the best or maximum value for $Kinf$ could be made about equal to 1.0. Of course, a self-sustaining critical reactor would not operate with $Kinf = 1.0$ since neutron leakage would make $Keff$ less than 1.0 and thereby be convergent to a quiescent state. Known reactors of this type require an enrichment of $U^{235}$ in order to operate at criticality.

According to the principle of my invention, however, natural uranium alone in a water environment may be used as a power reactor. In this type of reactor the fuel is natural uranium (0.71% $U^{235}$ and 99.29% of $U^{238}$) in the form of slugs or rods. The rods of natural uranium are arranged in a lattice appropriately suspended in light water. By calculation, using known design equations, a cylindrical form of core 22 has a radius of 77 cm. and a height of 150 cm. The mass of the rods is 140,000 kilograms and the light water is 10,000 kilograms. Here, water is preferred to sodium as the coolant.

Additional modifications in this structure, of the reactor system described for the fast-breeder form of the invention, include a reflector layer 50 made of light water rather than graphite; and an absorber layer 15 made of thorium or depleted uranium (natural uranium which has its content of $U^{235}$ depleted). $Keff$ for a core of this design is 0.95 and $Kinf$ is 1.0. Since $Kinf$ is a maximum, any changes in composition of the core serve only to reduce $Kinf$ below 1.0 whereby a supercritical configuration or concentration is impossible. Because of the strong fast neutron fission of uranium ($U^{235}$), it is expected that this form of my invention would have a conversion or breeding ratio of plutonium ($Pu^{239}$) from uranium ($U^{235}$) greater than unity. Calculations show that this breeding ratio is about 1.2 and is superior to critical reactors of this type.

The breeding of fuel in this form of reactor increases the useful life of the fuel, thereby reducing the requirement for reloading. There is a very large neutron flux which causes an accumulation of poisonous fission products which absorb neutrons and seriously affect reactor operation. Considering such poisonous fission product effects, a reactor of my invention with $Kinf$ of 1.0 and a $Keff$ of 0.95 will during operation have the valve $Kinf$ reduced to 0.97 and $Keff$ to 0.92 due to xenon poisoning. The intrinsic neutron magnification M (discussed and explained in my patent application Serial No. 654,837) in the final stage N9 will be depressed from 20 to 12. This depression in M may be compensated for by increasing the neutrons supplied to the system by a factor of 2. This is accomplished by increasing the neutron output from the accelerator 11 into stage N1 of the Convergatron.

In the event that the reactor is shut down, the xenon concentration will increase due to decay of $Iodine^{135}$ to $Xe^{135}$ which in turn will affect $Keff$ by reducing it perhaps to 0.80. When the reactor is later started the dynamic blanket will feed neutrons into stage N9 converting a substantial fraction of the poisonous $Xe^{135}$ to the non-poisonous form $Xe^{136}$. During the process of converting the poisonous to non-poisonous from of Xenon, $Keff$ will rise from its lower value of 0.80 gradually to the value 0.95. The magnification M again will increase to 20 for normal operation.

In operation, this water moderated uranium reactor is similar to that of the fast breeder reactor. The core operating at $K_{inf}$ equal to 1.0, the neutron leakage being compensated for by the neutron flux from the dynamic blanket 20, acts as though its medium were infinitely large.

In a still further modified form of the invention useful for any type of reactor it is possible to establish a self-sustaining yet subcritical operation by the use of feed-back of fuel from a higher neutron flux Convergatron stage to a lower neutron flux Convergatron stage. The principle of feed-back depends upon the characteristics of certain types of fissionable materials which have the feature of delayed neutron emitting fission product precursors included in a mobile form of fuel.

In the drawing is schematically shown a piping 31 connecting fuel region 14 to stage N7 to fuel region 14 of stage N5. A pump 30 is arranged to pump the liquid fuel from stage N7 to stage N5. An additional pump and pipe (not shown) is connected, preferably in the upper portion of dynamic blanket 20, to transfer fuel from stage N5 to provide the circulation required.

In operation, fuel containing the delayed neutron emitters is circulated from stage N7 to stage N5. The rate of circulation is synchronized to the time interval of delay in the production, in the particular fuel, of the delayed neutrons. The delayed neutrons emitted while the fuel is in the fuel region of stage N5 will augment the neutrons being supplied from the earlier stages N1–N4. By the proper selection of fuel circulation it is possible to remove the exciting source 11 from the system. Such a system can sustain substantially continuous operation in a closed cycle system. Stages N1–N4 including neutron source 11 may then be removed.

The heat absorbing and coolant system described, effects a neutron flux which is of a greater value in the central portion than at the top or bottom. This flux distribution can be made substantially flat by the proper design of the reflector 50. Since the coolant enters the reactor core 22 at a lower temperature than the coolant which leaves the reactor, a higher heat output from the fuel is permissible at the inlet end. Advantageously, this principle may be applied to the invention by the use of the feed-back of delayed neutrons discussed above. Introducing delayed neutrons in the liquid fuel in the portion of the region where the coolant enters will insure a maximum flux at that portion. In the reactor art this is termed "roof topping."

While the above discussion has been primarily directed to plutonium breeding the principle of the invention may be adapted in the use of thorium and $U^{233}$ as the principal fuel enrichment.

The following table summarizes the primary design and operating features of the two forms of the subcritical reactor of my invention as compared to supercritical reactors.

|  | 1 | 2 | 3 | 4 |
|---|---|---|---|---|
| $K_{inf}$ | 1.3 | 1.3 | 1.0 | 0.99 |
| $K_{eff}$ | 1.0 | 1.0 | 0.95 | 0.94 |
| Fuel Inventory in the Core—Kilograms | 500 | 450 | 1,400 | 140,000 |
| Fuel Cost (millions of dollars) | 10 | 9 | 30 | 5.6 |
| Blanket in Kilograms | 46,000 | 50,000 | 100 | 100 |
| Blanket Cost (millions of dollars) | 1.5 | 1.5 | 2 | 2 |
| Megawatts Heat generated | 300 | 300 | 1,000 | 1,000 |
| Conv. or Breeding Ratio | 1.2 | 1.8* | 1.6* | 1.2 |

Column 1 is a PRDC design for a supercritical fast breeder reactor using uranium as the original fissile material (37% $U^{235}$ and 63% $U^{238}$).

Column 2 is a PRDC design for a supercritical fast breeder reactor using plutonium as the original fissile material (10% $Pu^{239}$ and 90% $U^{238}$).

Column 3 is a design of my invention for a subcritical fast breeder reactor using plutonium as the original fissile material (6% $Pu^{239}$ and 94% $U^{238}$).

Column 4 is a design of my invention for a natural uranium fissile material reactor moderated with light water, by which plutonium is converted from $U^{235}$, the original fissile material being 0.7% $U^{235}$ and 99.3% $U^{238}$.

Briefly, the various features as tabulated are as follows: the factors $K_{inf}$ and $K_{eff}$ are is as described above. The fuel inventory in the core in kilograms is the weight of the fuel required for each of the reactors. The fuel cost in millions of dollars is based on present day cost of the fuels. The blanket in kilograms is the weight of the neutron absorbing blanket in the core of the critical reactor (columns 1 and 2). In the subcritical system (columns 3 and 4) this is the weight of fuel in stages N1 to N8. The power produced by each of the reactors is listed under the heading megawatts heat generated. The conversion or breeding ratio for each of the reactors is also given, the values marked with an asterisk being an estimate. It is seen from the table that the most economical type of reactor of the invention is that shown in column 4.

While the theory of the convergent nuclear chain fission reaction in uranium as set forth therein is based upon the best presently known experimental evidence, I do not wish to be bound thereby as additional experimental data later discovered may modify the theory discussed.

I claim:

1. A neutronic power reactor comprising means responsive to neutrons from an external source of neutrons for producing and sustaining a subcritical neutronic chain reaction including a core of fissile material of concentration and composition insufficient for a divergent neutronic chain reaction, said core having a multiplication factor ($K_{inf}$) approximating unity but not exceeding the prompt criticality of the fissile material, an external source of neutrons, means to augment the neutron flow from said source and supply the augmented neutron flow to said core at the location and in the amount of neutron leakage from said core, said augmentation means including a plurality of neutron amplifier stages each including in sequence a moderator input zone containing neutron moderator material in which neutrons of epithermal energy from said source are moderated to thermal energy levels and a fuel zone containing neutron fissile material in mass concentration and geometric configuration adapted to augment the neutron flow by a steady-state subcritical reaction, the effective multiplication factor ($K_{eff}$) of said fuel zone being less than unity, and, between each stage and next succeeding stage, a neutron barrier substantially opaque to thermal neutrons but transmissive to epithermal neutrons, at least the last stage being arranged substantially to surround said core in such a manner that neutrons are supplied to said core to equal substantially the leakage from said core at the approximate location of the leakage, whereby a steady-state subcritical neutronic chain reaction is produced and sustained in said core, said neutron fissile material being in a fluid state in at least two of said neutron amplifier stages, and means to circulate a portion of the fluid fissile material in the fuel zone of one of said two stages to the other of said two stages, the fluid fissile material having the characteristic of emitting neutrons with appreciable time delays after excitation by neutrons in said one stage, said circulating means including means to synchronize the rate of circulating the fissile material with the time delays of neutron emission so that the delayed neutrons are emitted in said other stage.

2. A reactor according to claim 1, wherein a reflector of moderator material surrounds said core, said reflector being adapted to pass neutrons from said source to said core, said reflector being arranged to reflect neutrons from said core back into said core whereby the sum of the reflected neutrons and the source neutrons is equal to the total leakage at the location and in the amount of the total leakage from said core.

3. A reactor according to claim 1, wherein the effective multiplication factor ($K_{eff}$) of said core is 0.90 to 0.98.

4. A reactor according to claim 1, having at least four stages, the fuel circulating means being arranged to circulate fuel between the first and third stage, the first stage operating at the lowest neutron flux.

5. A reactor according to claim 4, wherein the flux of delayed neutrons in said first stage is sufficient to sustain subcritical fission in the fuel zone of said stage independent of said source.

6. A reactor according to claim 1, wherein said core consists of fissile plutonium ($Pu^{239}$) and non-fissile uranium ($U^{238}$), the ratio by weight of said plutonium to said uranium being 0.06.

7. A reactor according to claim 1, wherein said core consists of a lattice of natural uranium rods immersed in light water.

8. A reactor according to claim 1, including passages in said core adapted to the flow of liquid sodium therethrough, means for circulating sodium through said passages, heat transfer means for absorbing heat from said sodium after it has been heated by fission within said core, means for feeding sodium into said passages, and means for removing sodium from said passages.

9. A reactor according to claim 1, wherein a reflector of moderator material surrounds said core and a neutron barrier material surrounds said reflector.

10. A reactor according to claim 2 wherein the moderator material is graphite.

11. A reactor according to claim 2 wherein the moderator material is water.

12. A reactor according to claim 9 wherein the neutron barrier material is thorium.

13. A reactor according to claim 9 wherein the neutron barrier material is depleted uranium.

References Cited by the Examiner

UNITED STATES PATENTS

| | | | |
|---|---|---|---|
| 2,579,994 | 12/51 | Zinn | 204—543 |
| 2,708,656 | 5/55 | Fermi et al. | 176—41 |
| 2,770,591 | 11/56 | Wigner et al. | 176—31 |
| 2,780,595 | 2/57 | Fermi | 176—19 |

OTHER REFERENCES

Principles of Nuclear Reactor Engineering, Glasstone (Von Nostrand, Princeton, 1955), page 27.

Proceedings of the International Conference on the Peaceful Uses of Atomic Energy, vol. III, United Nations, New York, 1956, pp. 298–303.

Nucleonics, vol. 15, No. 6, June 1957, pages 116 and 117.

KAPL–M–JS–2, Theory of the Neutron Amplifier Reactor, Stewart, 52 pages, particularly pages 1–13, Oct. 25, 1957.

KAPL–M–RWS–1, A Stable Fission Pile with High Speed Control, Samsel, Feb. 10, 1947, Declass. Mar. 9, 1957, 7 pages.

CARL D. QUARFORTH, *Primary Examiner.*

LEON D. ROSDOL, ROGER L. CAMPBELL,
*Examiners.*

UNITED STATES PATENT OFFICE
CERTIFICATE OF CORRECTION

Patent No. 3,197,375                          July 27, 1965

Lyle B. Borst

It is hereby certified that error appears in the above numbered patent requiring correction and that the said Letters Patent should read as corrected below.

Column 1, line 51, for "designed" read -- designated --; column 3, line 43, for "placed. To meet this requirement, 5% of" read -- neutrons per fission, the fissions will produce --; line 44, for "estimated" read -- estimate --; line 52, for "of" read -- for --; column 4, line 56, for "valve" read -- value --; line 72, for "from" read -- form --; column 5, line 17, for "to" first occurrence, read -- of --.

Signed and sealed this 18th day of January 1966.

(SEAL)
Attest:

ERNEST W. SWIDER
Attesting Officer

EDWARD J. BRENNER
Commissioner of Patents